United States Patent [19]
Lawrence et al.

[11] Patent Number: 6,153,156
[45] Date of Patent: Nov. 28, 2000

[54] METHOD FOR PURIFYING LEADY OXIDES

[75] Inventors: Michel M. F. Lawrence, Inver Grove Heights; Michael A. Kepros, South St. Paul, both of Minn.

[73] Assignee: GNB Technologies, Inc., Mendota Heights, Minn.

[21] Appl. No.: 09/365,932

[22] Filed: Aug. 2, 1999

[51] Int. Cl.⁷ ............................. C22B 13/00; C01G 21/06
[52] U.S. Cl. ........................... 423/89; 423/619; 241/24.1
[58] Field of Search .................... 423/89, 619; 241/24.1; 209/3, 11, 715

[56] References Cited

U.S. PATENT DOCUMENTS 4,269,811  5/1981  Striffler, Jr. et al. .
5,173,277  12/1992  Montgomery et al. .
5,540,915  7/1996  Yasuda et al. .
5,660,600  8/1997  Vyas .

OTHER PUBLICATIONS

Boher et al., Journal Of Solid State Chemistry 55, pp. 245–248, 1984.

Primary Examiner—Steven P. Griffin
Assistant Examiner—Christina Ildebrando
Attorney, Agent, or Firm—Leydig, Voit & Mayer, Ltd.

[57] ABSTRACT

A process for providing a leady oxide having reduced levels of undesired metallic impurities such as, for example, bismuth and/or silver, comprises roasting the leady oxide to convert part to orthorhombic PbO, exposing the roasted leady oxide to particle size reduction so that the tetragonal PbO can be separated from the orthorhombic PbO fraction, and recovering the orthorhombic fraction having the reduced level of impurities.

8 Claims, 3 Drawing Sheets

METHOD FOR PURIFYING LEADY OXIDES

FIELD OF THE INVENTION

This invention relates to leady oxides and, more particularly, to processes for purifying leady oxides.

BACKGROUND OF THE INVENTION

In lead-acid batteries, a finely divided mixture of lead oxide powder and metallic lead particles is the key ingredient in preparing positive and negative active material. It is known that the physical and chemical characteristics of this leady litharge, or battery oxide, have a profound impact on the performance and life expectancy of the battery. Battery oxide is manufactured from either primary (mined lead) or secondary (recycled or refined) lead. The lead used from either source must be of extremely high purity; and, commercially, battery oxide is typically made using either the Barton or ball mill process.

In the Barton process, molten lead is metered into a reactor or a Barton Pot where it impinges on a rotating paddle. The resulting droplets of lead are oxidized and can fade out in an air stream.

The ball mill process converts solid lead pieces directly into oxide through attrition by causing them to rub against each other within a rotating reactor or ball mill. The lead in the ball mill is the grinding media as well as a reactant. The particles or agglomerates produced by the molten lead Barton process are droplike or spherical whereas those produced by the solid state ball mill grinding process are flat or flakelike.

In general, the oxidation reaction in either process is controlled to provide the composition desired, typically approximately 75% of the product being oxidized to lead oxide, leaving about 25% as finely divided metallic lead to be oxidized in subsequent processes. In addition to chemical composition, particle size or reactivity of the material is measured and controlled. Among the process control variables there are included reactor temperature, air flow and lead feed rate.

The oxide exiting either the Barton or ball mill reactor is conveyed by an air stream to separating equipment, i.e., a settling tank, cyclone and bag house, after which it is stored in silos, large hoppers or drums for use in paste mixing. Purity of the lead feed stock is extremely critical because minute quantities of some impurities can either accelerate or slow the oxidation reaction markedly.

Still further, recovery from scrap is an important source for the lead demands of the United States and the rest of the world. In the United States, according to some sources, over 70% of the lead requirements are satisfied by recycled lead products. The principal types of scrap are battery plates and paste, drosses, skimmings, and industrial scrap, such as solders, cable sheathing, and the like. Most scrap is a combination of metallic lead and its alloying constituents mixed with compounds of these metals, usually oxides and sulfates. Therefore, recovery as metals requires reduction and refining procedures.

Because it is estimated that some 80% of the lead consumed in the United States is for use in lead-acid batteries, most recycled lead derives from this source of scrap. More than 95% of the lead is reclaimed. Hence, the bulk of the recycling industry is centered on the processing of lead battery scrap.

In general, such a recycling process involves releasing the lead-bearing components from the case and other non-lead containing parts, followed by the smelting of the battery plates, and refinement to pure lead or specification alloys. Each step in the secondary operations must meet the environmental standards for lead in the concentration in air. There are well-defined, sophisticated technologies for the recovery of all materials of value in a battery. Often, after acid removal, scrap batteries are fed to a hammer mill in which they are ground to relatively small particles. The ground components are fed to a conveyor and passed by a magnet to remove undesirable contamination. The lead scrap is then classified on a wet screen through which fine particles of lead sulfate and lead oxide pass, and the large oversized solid particles are passed on to a separator, such as a hydrodynamic separator. The fine particles are settled to a thick slurry and to a clarified wash water recirculated to the wet screen. The paste recovered in the initial screening stage is often not in a form suitable for lead smelting because of its high sulfate content so a desulfurization step is typically carried out. Almost all battery scrap and paste are converted to impure lead or lead alloys by pyrometallurgical processes employing blast, reverberatory, rotary, Isasmelt, or electric furnaces.

The most common procedures for making leady oxide or battery oxide rely on specifying the required purity level of the starting lead before oxidation. The requirements vary depending upon the type of application.

For example, sealed lead-acid cells, often termed "VRLA" cells (viz., valve-regulated lead-acid), are widely used in commerce today. As is known, sealed lead-acid cells utilize highly absorbent separators, and the necessary electrolyte is absorbed in the separators and the plates. Such sealed lead-acid cells and batteries are widely used in commerce today for various applications that have widely differing requirements. In one type of application, generally termed as stationary applications, lead-acid cells and batteries are used, for example, for load leveling, emergency lighting and commercial buildings, as stand-by power for cable television systems, and in uninterruptible power supplies. The uninterruptible power supply may be used to back up electronic equipment, such as, for example, telecommunication and computer systems, and even as a back up energy source for entire manufacturing plants. In addition, there are many applications where sealed lead-acid cells and batteries are used in what are termed motive power applications. Such lead-acid cells and batteries are thus used as a power source for electric vehicles, fork-lift trucks, and the like.

The operation of VRLA cells and batteries is extremely complex and involves a variety of aspects. One important aspect is that VRLA cells must avoid conditions in service in which the temperature within the cell increases uncontrollably and irreversibly. Such a condition is often termed "thermal runaway" in such cells. Thermal runaway is an ongoing issue which is critical in designing such cells and batteries.

For this reason, among others, at least some VRLA cell and battery manufacturers utilize primary lead. The objective is to minimize the level of contaminants as much as possible.

Other types of lead-acid batteries are flooded electrolyte batteries, such as automotive batteries. In this type of application, secondary lead is often used. Nevertheless, it is extremely important that the leady oxide used in such batteries has satisfactory purity levels as regards particular contaminants.

Yet, insofar as the inventors are concerned, there are no commercial methods available for directly lowering the impurity levels, and thereby satisfactorily purifying leady oxides having undue levels of various undesirable contaminants. While some leady oxide manufacturers may occasionally dilute a contaminated oxide by adding a specified amount of an oxide of high purity to effectively lower the total contamination level to an acceptable level, this procedure cannot always be applied to battery grade oxides. More particularly, such a dilution technique can effect previously specified physical properties, such as particle size and surface area.

Still further, none of the other possible procedures that may be envisioned to deal with impure leady oxides are satisfactory. While chemical conversion of the oxide to a suitable lead salt and then utilizing specific gravity concentrators can be considered, a process of this sort is typically a precursor to other refining processes such as pyrometallurgy or electrometallurgy. Alternatively, such impure leady oxides can be converted back to a lead metal utilizing pyrometallurgy (smelting and drossing processes) which, through additions of other elements and the selection of suitable temperatures, may allow removal of some undesired contaminants from the lead. Obviously, the high purity lead produced must then be oxidized to a suitable form of lead oxide for battery use.

As is apparent from the above discussion, both pyrometallurgy and electrometallurgy require several process steps going back to the preparation of the feed lead for the oxidation process. These additional steps can add substantial costs and do not allow any recovery of an oxide batch or lot that has an acceptable level of impurities. Further, electrometallurgy is still used sparingly in practice since its economic justification normally relies on the presence of sufficient contaminating impurities to make the value of the collected impurities cover the additional cost. As an aside, the excessive costs in such processes derive from the need for extensive environmental controls, the need to carefully control the conditions of the aqueous solutions and electrical plating parameters, and the associated plating bath maintenance costs.

As a further and critical complication, pyrometallurgy and electrometallurgy do not address all contaminants. Specifically, two problem contaminants are bismuth and silver, the latter being caused by the increase in use of lead-based alloys including some level of silver as an alloying ingredient. For silver, a complex, multi-step process is used. This process, called the Parkes process, uses excess zinc to precipitate with the silver impurity (also works for gold, copper, tellurium and platinum). After the Parkes process, which in itself has many steps, the lead needs to be de-zinced by either vacuum distillation or oxidation with caustic soda (the Harris process). Bismuth is removed using the Betterton-Kroll process after dezincing. This process forms $CaMg_2Bi$ as dross that can be removed. Again, the kettle needs to be treated by the Harris process or chlorination to remove the calcium and magnesium.

It is known that leady oxide roasted at a temperature greater than 480° C. and probably, at a temperature near 600° C., for an adequate period of time can convert most of the leady oxide to an orthorhombic($\beta$)PbO form. Further, it has been appreciated that the leady oxide mixture will convert to PbO($\beta$) in such a manner that in excess of 90% of certain impurities will be trapped in the tetragonal($\alpha$)PbO that has not been converted. This research was reported by Boher and Garnier, J. Solid State Chem., 55, pp. 245–248 (1984). In general, the table in that report shows that the tetragonal lead oxide has trapped therein about 90% or more of the manganese, copper, iron, and zinc impurities. Likewise, at this point, the tetragonal and orthorhombic PbO are of similar particle size, with the median particle size being typically somewhere between 4 and 8 microns. Such a mixture can comprise as much as 95% or even more of the orthorhombic species.

Despite the clear need for an effective process for directly purifying leady oxides, no such process exists. It would be highly desirable to have a refined leady oxide product that VRLA battery manufacturers would consider satisfactory and to provide such leady oxides that are adequately free of problem contaminants so that automotive battery manufacturers would not have to incur the expense of costly purification methods.

Accordingly, and in general, a principal object of the present invention is to provide a facile process for directly purifying leady oxides.

Yet another object lies in the provision of a process that can achieve highly purified leady oxides in a cost-effective way relative to the use of electrometallurgy and pyrometallurgy processes.

A still further and more specific object is to provide such a process which is capable of being readily incorporated into existing processes for making leady oxides.

Even more specifically, an object of this invention is to provide a process for purifying leady oxides which can be readily combined with a Barton Pot process.

Yet another object of the present invention is to provide a process capable of at least substantially eliminating the presence of problem contaminants in the purified leady oxides. A more specific object in this connection lies in the provision of a process for purifying leady oxides which can reduce to the level desired such problem contaminants as bismuth and silver.

Other objects and advantages of the present invention will become apparent as the following description proceeds, taken in conjunction with the accompanying drawings. While the present invention is susceptible to various modifications and alternative forms, specific embodiments thereof will be described in detail herein. It should be understood, however, that it is not intended to limit the invention to the particular forms disclosed, but, on the contrary, the intention to cover all modifications, equivalents, and alternatives falling within the spirit and scope of the invention as expressed in the appended claims. Thus, while the present invention will be principally described in connection with purifying leady oxides, it should be appreciated that the present invention can be utilized to provide a soft lead having high purity, whether used in the battery, or in other, fields.

SUMMARY OF THE INVENTION

In general, the process of the present invention comprises roasting the leady oxide at a temperature and for a time sufficient to convert the desired portion of the PbO component of leady oxide to orthorhombic PbO and the remainder being tetragonal PbO, exposing the tetragonal and orthorhombic PbO to particle size reduction such that the particle size of the tetragonal PbO is reduced sufficiently to allow separation from the orthorhombic fraction, and separating the tetragonal and orthorhombic fractions. In this fashion, the collected orthorhombic PbO fraction can achieve extremely high purity, exceeding, it is believed, about 99.99% pure.

The process of the present invention is adaptable to use in conjunction with the Barton Pot process widely used to make battery grade leady oxides. Alternatively, the process of the present invention can be carried out in a straightforward fashion using any leady oxide source.

DETAILED DESCRIPTION OF THE INVENTION

Figure 1:
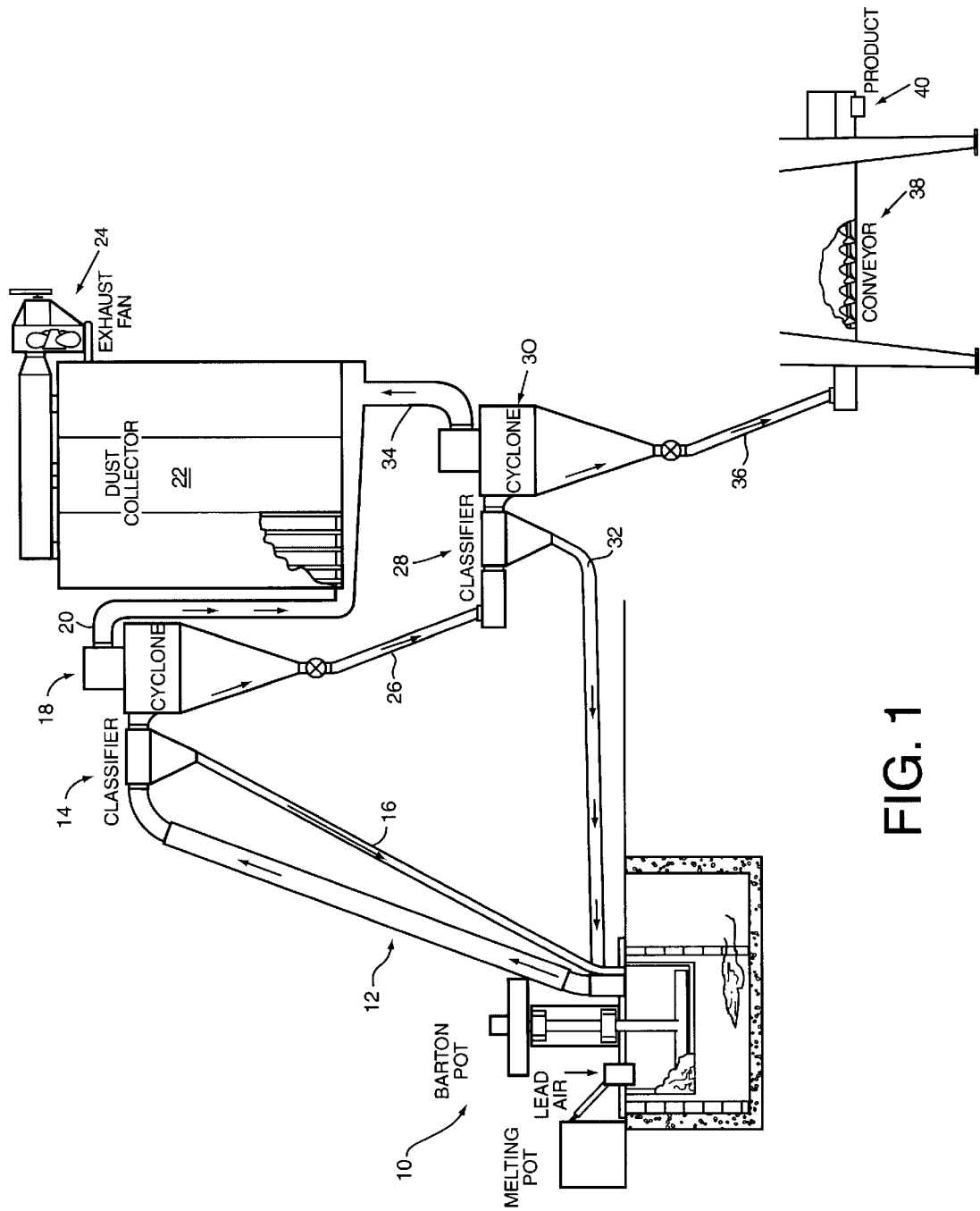
FIG. 1 is a schematic view illustrating the process of the present invention with a Barton Pot process modified to allow segregation of the respective types of leady oxides and to collect the highly purified oxide according to the present invention.

FIG. 1 shows a Barton Pot process modified pursuant to the present invention to achieve highly purified leady oxides. To this end, leady oxide is formed in the Barton Pot shown generally at 10. The conditions under which the leady oxides are formed are modified so that the roasting temperature is at least about 489° C. and up to a temperature of about 600° C. or so for a sufficient time so that the leady oxides comprise a mixture predominantly of orthorhombic ($\beta$)PbO and a minor amount of tetragonal($\alpha$)PbO. The vast majority of the impurities, including such problem contaminants as bismuth and silver, should be trapped in the tetragonal fraction.

In this embodiment, it should be appreciated that the proportion of the PbO that can be converted to orthorhombic PbO may be no more than about 50%, or perhaps 60%, of the total PbO. If higher conversions are considered necessary, then a standalone process should be used. Another aspect which might dictate that a standalone process be employed is the relative amount of lead desired in the leady oxide. Thus, adjusting the Barton Pot process parameters to maximize the PbO($\beta$) level may decrease the lead level more than desired for some applications. While the purified leady oxides may still be used for blending with other sources, a standalone process may be the process of choice.

The leady oxides produced from the Barton Pot 10 is transported via line 12 to a primary air classifier 14 where the coarse fraction is returned via line 16 to the Barton Pot 10 for reprocessing. The remaining fractions are separated in a cyclone separator 18.

The fines fraction is thus transported via line 20 to a collection point, such as a conventional dust collector 22 having an exhaust fan 24. As is known, the fines fraction collected can be returned to the smelter for reprocessing.

According to the present invention, the properly sized fraction from cyclone 18 is transported via line 26 to a secondary classifier. More particularly, while the tetragonal and orthorhombic leady oxide fractions have a similar particle size, subjecting a mixture of the two to a suitable particle size reduction step will allow ready segregation. Thus, following such a particle size reduction step, the particle size of the orthorhombic fraction will change very little, while the particle size of the tetragonal fraction is significantly reduced, up to as much as 50%, or even more.

Accordingly, and while a separate size reduction step can be carried out, as will be discussed in connection with the standalone process, a secondary air classifying step will intrinsically reduce tetragonal fraction by impingement. Hence the process in conjunction with an air classifier should be capable of achieving satisfactory separation of the tetragonal fraction relative to the orthorhombic fraction.

More particularly, it is envisioned that the first particle sizing process (i.e., classifier system) will permit segregation of the particles into at least three particle size ranges consisting of a coarse fraction where the particles diameters are typically larger than about 40 microns, a medium fraction where the particle diameters range from about 0.2 microns up to about 20 microns and a fines fraction where the particles are less than about 0.2 microns in diameter. The coarse fraction is returned to the Barton Pot for further size reduction and/or chemical conversion. The medium fraction is transferred to the secondary classifier system, and the fines fraction is transferred and collected in a suitable bag-house or other dust collection system for eventual transfer to a suitable smelter or lead refining system such as an electrowinning operation.

The second classification thus involves a secondary air classifier 28 and a cyclone 30. The heavy or coarse fraction, having a particle diameter typically larger than about 20 microns, can be returned from classifier 28 to the Barton Pot 10 via line 32. The fines fraction consisting of particles smaller than about 1 or 2 microns in diameter and including the reduced tetragonal fraction, can then be sent to suitable collection, such as dust collector 22 via line 34. Alternatively, depending upon the relative amount of the contaminated fine tetragonal particle fraction, a second dust collector 22 or a second bag house could be utilized. The purified leady oxide with a particle size diameter range from about 1 or 2 microns up to about 20 microns then exists the cyclone 30 through line 36 and can then be collected for further use, as by being conveyed via conveyer 38 to a product source collection 40.

Figure 2:
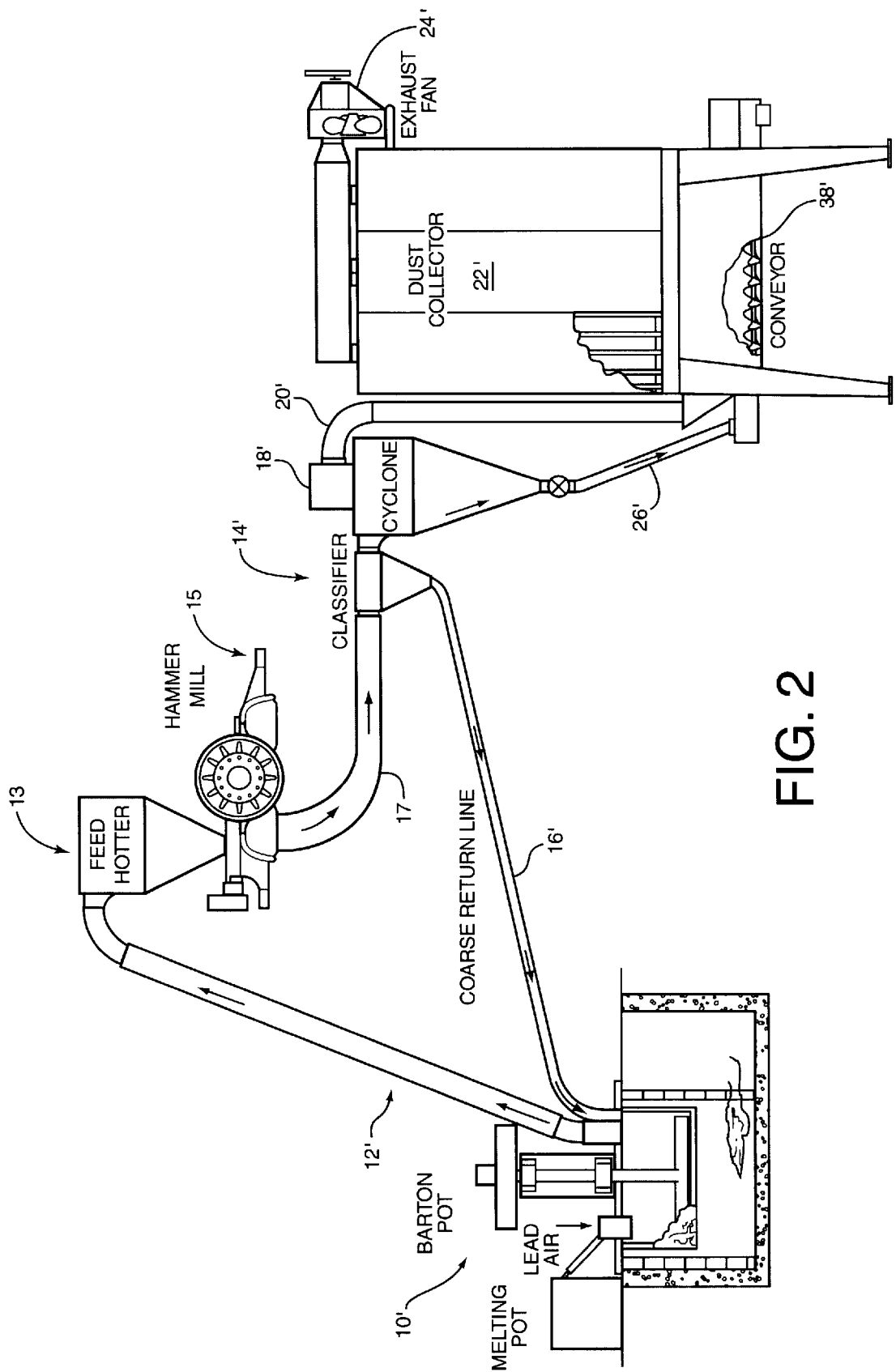
FIG. 2 is a schematic view showing another modified Barton Pot process where a hammer mill has been included to induce additional particle size reduction to improve separation of the contaminated materials from the purified oxide according to the present invention.

FIG. 2 shows a further embodiment for making leady oxides pursuant to the present invention utilizing a hammer mill to induce additional particle size reduction of the leady oxide from the Barton Pot. Much of the equipment and the process is the same as that illustrated in the embodiment of FIG. 1. Accordingly, the same numerals are used (with a prime designation) for the same equipment and lines.

Thus, the leady oxides are made in Barton Pot 10' and then transported through line 12' for further processing and separation. However, in this embodiment, rather than using a dual classification system as in the embodiment of FIG. 1, the leady oxide is fed into a hopper 13 and is subjected to particle size reduction via hammer mill 15.

The output from the hammer mill then proceeds through line 17 into classifier 14' with the coarse fraction returned to the Barton Pot 10' via line 16'. The remaining fractions enter cyclone 18', and the fines are transported via line 20' to dust collector 22', equipped with the exhaust fan 24'.

The leady oxide product stream exits cyclone 18' via line 26'. The product can then be transported as desired, e.g., via convey 38'.

Figure 3:
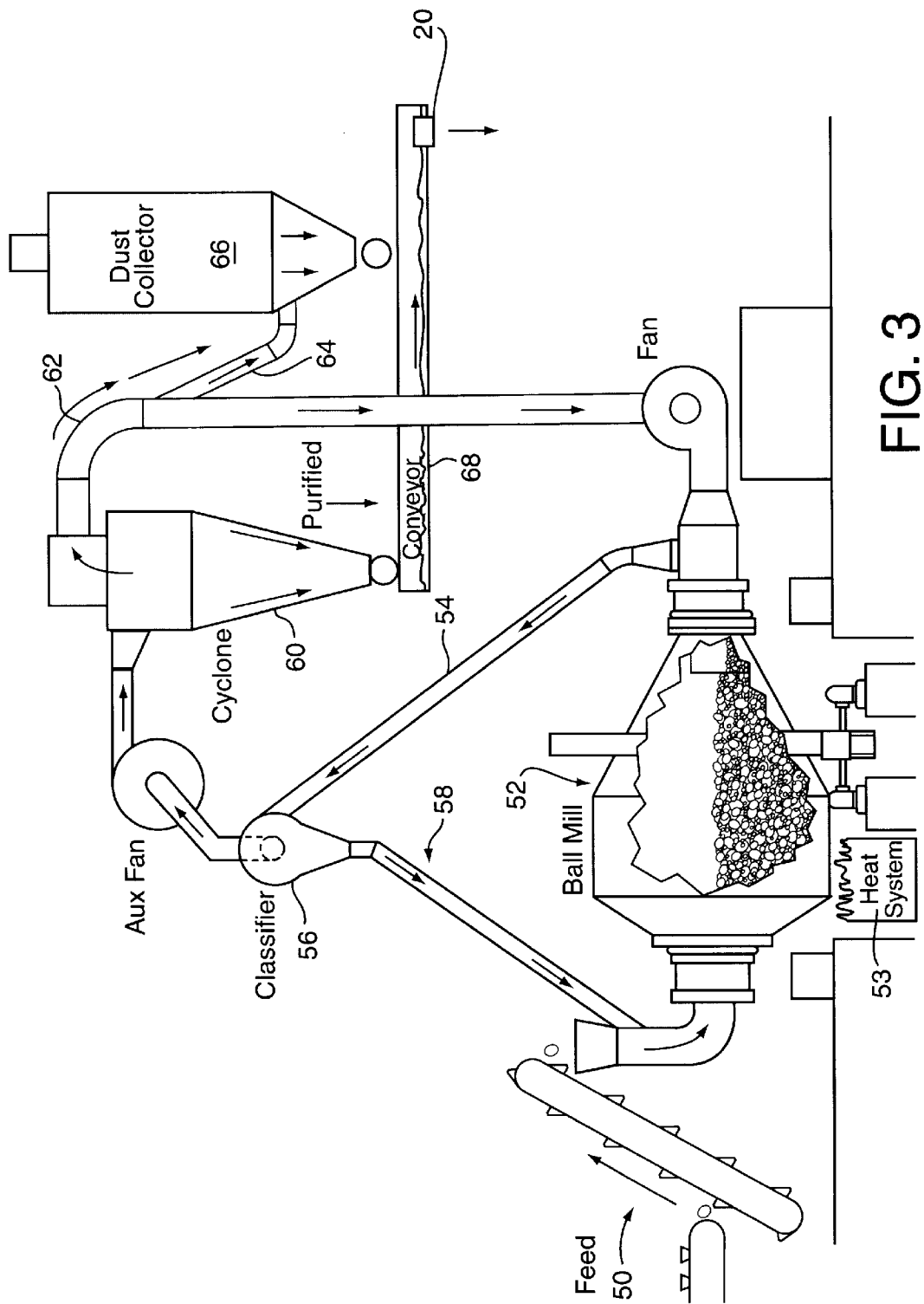
FIG. 3 is a schematic view showing one embodiment of a standalone process for forming the purified leady oxides according to the process of the present invention.

FIG. 3 shows a standalone system for purifying leady oxide from any source. Accordingly, the leady oxide feed 50 is transported to an appropriate size reduction step where the roasting step is simultaneously being carried out. As shown, a conical ball mill 52 is illustrated. This size reduction step reduces the size of the tetragonal fraction sufficiently so that separation from the thus-purified orthorhombic fraction can be achieved. A suitable heating system 53 (e.g., gas burners or an electrical heating jacket) roasts the leady oxide providing the desired conversion while the thus-produced mixture is ball milled to reduce the size of the tetragonal fraction.

The ball milled mixture exiting from ball mill 52 is thus transported via line 54 to a classifier 56 which returns the undesired coarse fraction, if any, to ball mill 52 via line 58. The desired particle size fraction, typically less than 20 microns in diameter, enters into cyclone 60 with the fines fraction containing the tetragonal species being transported via line 62 and 64 to a bag house or dust collector 66. This fraction can be returned to a smelter for reprocessing. The purified leady oxide exiting cyclone 60 can then be transported and collected as desired, as via conveyor 68 to the product collection 70. This purified oxide will typically have a particle size diameter range from about 2 to 20 microns.

The following Examples are illustrative, but not in limitation, of the present invention. It is believed that the results in these Examples demonstrate general proof of concept, illustrating that appropriate processing conditions and separation techniques should be capable of purifying leady oxides by concentrating, or trapping, undesired contaminants in a fines fraction.

EXAMPLE 1

Lead alloy precursor was prepared having copper and tin doped at levels of 950 ppm and 830 ppm respectively. Oxide was prepared from the lead precursor using the Barton pot process in conjunction with a hammer mill.

In this process, approximately five percent of the oxide is collected to the bag-house as fines. After preparation of the oxide, it was chemically analyzed and determined that only 751 ppm copper and 377 tin remained in the oxide. The expected levels of dopant in the oxide were 896 ppm copper and 783 ppm tin. This is based on 80% conversion to PbO and 20% free Pb remaining. In the process of oxide formation, 16.2% of the copper and 51.9% of the tin was lost to the 5% of fines collected into the baghouse. The ratio of copper in fines versus final oxide is 5:1. The ratio of tin in fines versus final oxide is 22:1.

EXAMPLE 2

Lead alloy precursor was prepared having copper doped at a level of 419 ppm. Oxide was prepared from the lead precursor using the Barton pot process in conjunction with a hammer mill.

In this process, approximately five percent of the oxide is collected to the bag-house as fines. After preparation of the oxide, it was chemically analyzed and determined that only 168 ppm copper remained in the oxide. The expected level of copper in the oxide was 395 ppm. This is based on 80% conversion to PbO and 20% free Pb remaining. In the process of oxide formation, 57.5% of the copper was lost to the 5% of fines collected into the baghouse. The ratio of copper in fines versus final oxide is 58:1.

EXAMPLE 3

Lead alloy precursor was prepared having silver doped at a level of 150 ppm. Oxide was prepared from the lead precursor using the Barton pot process in conjunction with a hammer mill. In this process, approximately five percent of the oxide is collected to the bag-house as fines.

After preparation of the oxide, it was chemically analyzed and determined that only 107 ppm silver remained in the oxide. The expected level of silver in the oxide was 141 ppm. This is based on 80% conversion to PbO and 20% free Pb remaining. In the process of oxide formation, 24.1% of the silver was lost to the 5% of fines collected into the baghouse. The ratio of silver in fines versus final oxide is about 7:1.

Thus, as has been seen, the present invention provides a facile process by which impure leady oxides can be directly and readily purified. The ability to utilize the conventional Barton Pot process while achieving the purified leady oxides of this invention enhances the ability to utilize the present invention.

The standalone process increases the versatility of application since any leady oxide source can be used and a particularly efficient process can be provided.

We claim:

1. A process for providing a leady oxide having reduced levels of metallic impurities which comprises providing leady oxide having PbO and a level of impurities, roasting the leady oxide at a temperature and for a time sufficient to convert a proportion of the PbO to orthorhombic PbO and the remainder to tetragonal PbO, exposing the resulting tetragonal and orthorhombic PbO fractions to particle size reduction such that the particle size of the tetragonal PbO is reduced sufficiently to allow separation from the orthorhombic fractions, separating the tetragonal and orthorhombic PbO fractions, and collecting at least the orthorhombic PbO fraction.

2. The process of claim 1 wherein the proportion of the PbO converted to orthorhombic PbO fractions is at least 50 percent.

3. The process of claim 2 wherein said proportion is at least 60 percent.

4. The process of claim 1 wherein said impurities include at least one of bismuth and silver.

5. The process of claim 1 wherein the roasting temperature is at least about 489° C.

6. The process of claim 5, wherein the roasting temperature is in the range of from about 489° C. to about 600° C.

7. The process of claim 1 wherein said leady oxide is produced by converting secondary lead in a Barton pot.

8. The process of claim 7 wherein the particle size reduction reduces the particle size of the PbO tetragonal fraction to at least 50 percent of that of the PbO orthorhombic fraction.

* * * * *